D. J. HANNA.
METHOD OF FACILITATING THE FERMENTATION OF DOUGH.
APPLICATION FILED FEB. 14, 1912.

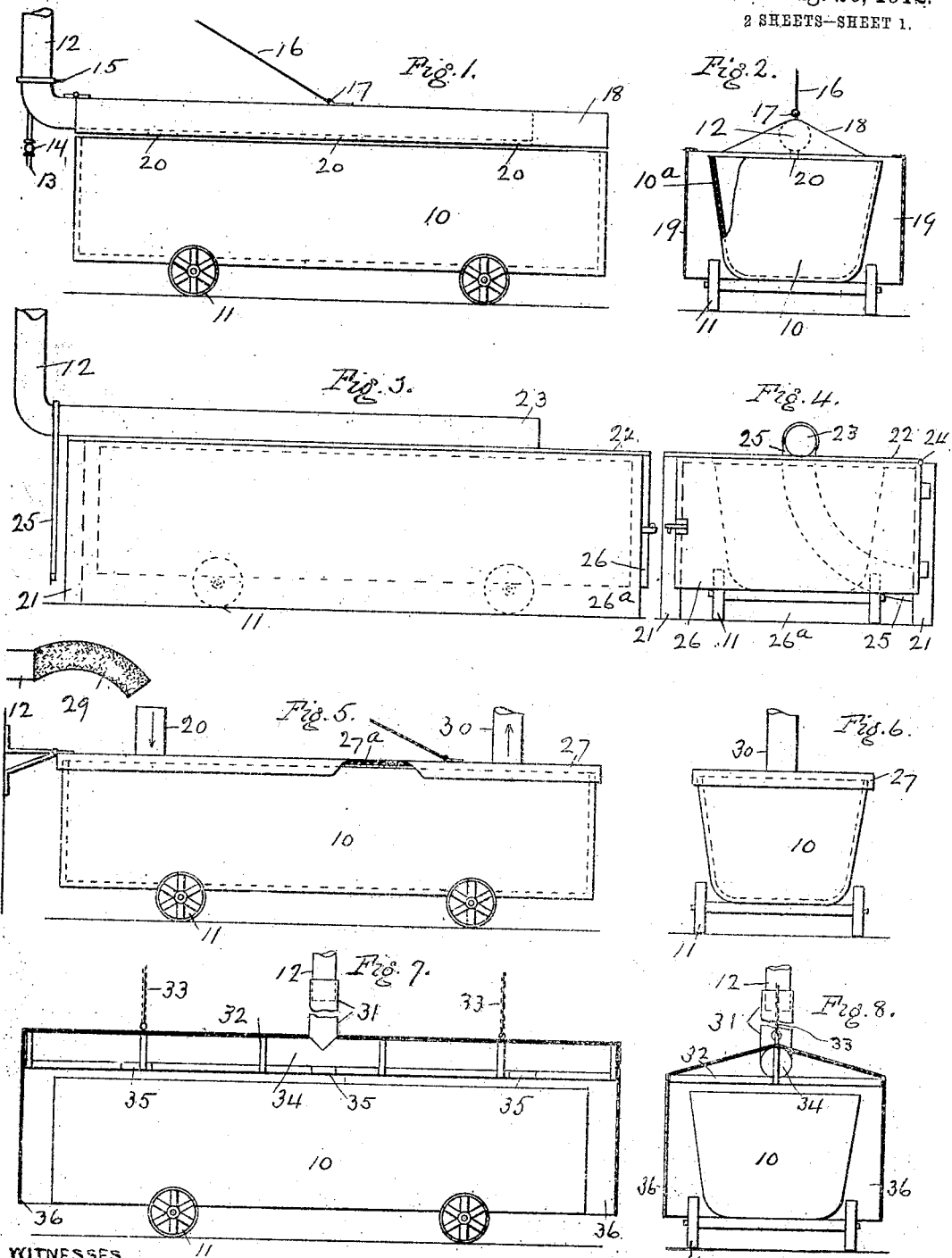

1,036,490.

Patented Aug. 20, 1912.

2 SHEETS—SHEET 2.

UNITED STATES PATENT OFFICE.

DAVID J. HANNA, OF FISHKILL-ON-THE-HUDSON, NEW YORK.

METHOD OF FACILITATING THE FERMENTATION OF DOUGH.

1,036,490.

Specification of Letters Patent.  Patented Aug. 20, 1912.

Application filed February 14, 1912. Serial No. 677,518.

*To all whom it may concern:*

Be it known that I, DAVID J. HANNA, a citizen of the United States of America, and residing at Fishkill-on-the-Hudson, in the county of Dutchess and State of New York, have invented a certain new and Improved Method of Facilitating the Fermentation of Dough, of which the following is a specification.

My invention relates to an improved method for facilitating the fermentation of dough, and relates particularly to the treatment of dough during the stages in the bread making process at which the dough is undergoing fermentation.

The object of my invention is to maintain the atmosphere in the immediate neighborhood of the dough under such conditions of temperature and humidity that the chemical reactions in the dough are permitted to develop to best advantage.

Figure 10:
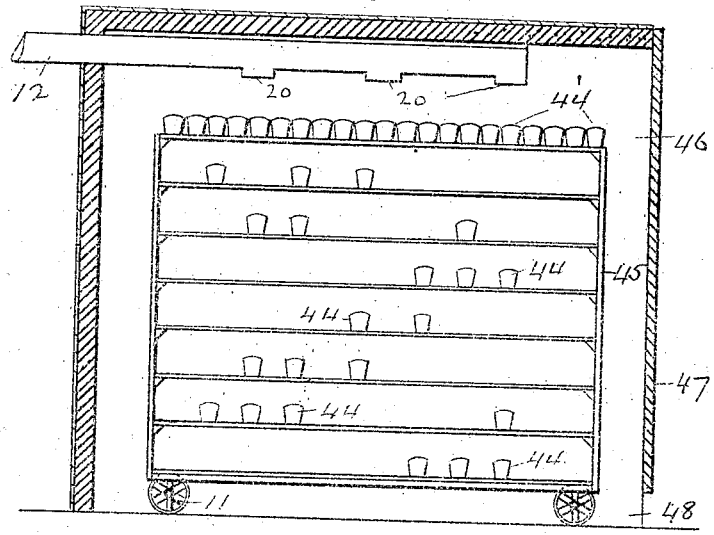
Figure 9:
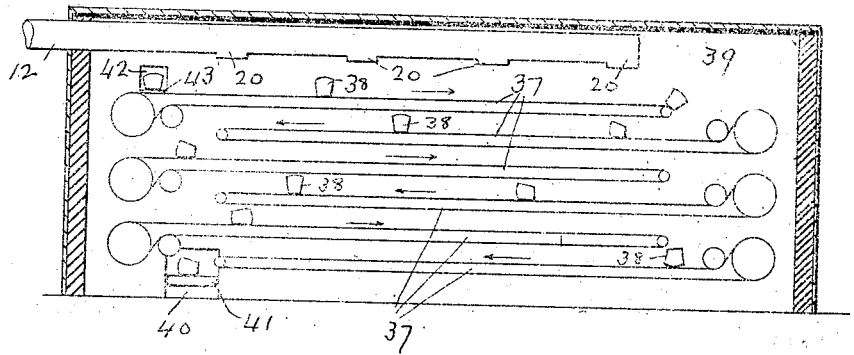

In the accompanying drawings, Figures 1 and 2 are respectively side and end elevations of one form of apparatus in which my process may be carried out; Figs. 3 and 4 are similar views of another form; Figs. 5 and 6 are similar views of still another embodiment of my invention; Figs. 7 and 8 are similar views of a further form; Fig. 9 is a vertical section of an apparatus in which the dough is carried upon a proofing conveyer; and Fig. 10 is a similar view of an apparatus suitable for the treatment of dough after it has been panned.

During the action of the yeast within the dough it is highly desirable that the latter be maintained at a temperature subject to no sudden variation and in an atmosphere which is sufficiently charged with moisture to prevent the formation of a skin or crust upon the surface of the dough such as would tend to prevent the escape of the gases from the dough and thus have the effect of forming blow holes in the dough which detrimentally affect the final loaf. Furthermore, it is advantageous to maintain a circulation of air around the dough so that such gases as are given off may be led away, thus keeping the dough surrounded by a comparatively uncontaminated atmosphere into which the gases more freely escape than is the case where these gases are permitted to settle upon and around the dough. Furthermore, the access of fresh air to the dough is highly desirable inasmuch as the oxygen which it brings seems to have the effect of promoting the chemical reactions which are progressing in the dough, and the latter yields a whiter loaf. These considerations having impressed themselves upon the applicant, the embodiment thereof in a suitable method for treating the dough to maintain these most advantageous conditions, was undertaken with the following conclusions: First, that the dough must be maintained in a substantially closed receptacle or chamber in which means must be provided for maintaining a temperature at the desired degree of heat, without being subject to sudden variations of temperature not under control. Second, the temperature control means should preferably be of such character that a gradual variation of temperature either up or down may be effected. Third, means for maintaining the atmosphere at the proper degree of humidity, and fourth, means for maintaining a constant circulation of fresh air so as to lead to the dough a constant supply of oxygen. Inasmuch as these conditions should exist not only while the dough is in the fermentation stage after its initial mixture in the mixing apparatus, but also after it has been passed through the divider and is on its way to the molding apparatus, and also after it has been panned and is waiting for the oven, obviously no single apparatus which is adapted to treat the dough in its various stages of preparation for the oven, suggested itself.

The apparatus illustrated in the drawings is designed to secure the desired conditions for the dough at three stages, first, in the troughs into which the mixing apparatus discharges, second, after the dough has passed through the divider and while recovering preparatory to being passed into the molding apparatus, and finally, after it has been panned and is undergoing its final fermentation before being passed into the oven.

In Figs. 1 and 2 I have shown the usual trough 10 preferably provided with a heat-insulating lining 10ª, into which the dough is discharged from the mixing apparatus. This trough, as is customary, is mounted upon rollers 11, so that it may be readily pushed from place to place about the bakery. At a convenient place in the latter, I arrange one or more pipes 12 from a blower (not shown). The air passing through these pipes is properly conditioned to contain the desired amount of moisture, the latter being derived from any suitable source, for instance, a steam pipe 13 opening into the air pipe 12 and controlled by a cock 14. A damper valve 15 may be arranged in the pipe 12 to control the amount of air coming from the blower. As shown, the lower end of the pipe 12 is angled out substantially horizontally, being supported in any suitable way, for instance by a guy wire 16 extending from the wall to an eye 17 on the pipe. A deflecting hood 18 is arranged over the pipe and is of slightly less width than the upper diameter of the trough, so as to permit access to the interior of the trough in order to work down the dough after its first rise, as is usually desirable.

In order to maintain the temperature of the air substantially uniform and to protect the dough against uncontrollable drafts, I prefer to provide a flexible curtain 19, carried by the hood and hanging down on both sides of the trough to a point near the floor. It is thus obvious that the air delivered by the pipe 12 can escape only by passing down around the outside of the trough and thus maintaining the sides of the latter at substantially the same temperature as the dough contained within the same. The downwardly projected ports 20, from the pipe 12, insure the impingement of the fresh air directly upon the dough so that the gases which are given off by the fermenting yeast are swept out of the trough by the blast and escape around the lower edges of the curtain.

In Figs. 3 and 4 I have shown a more substantial chamber with side walls 21 extending from the floor to the hinged top 22 which carries the distributer pipe 23 for the humidified and warmed air. The cover 22 is provided with a hinge 24 at one side so that it may be lifted to permit access to the dough in the trough for working down its first rise, as above explained. A valve plate 25 may be carried by the cover to automatically close the end of the pipe 12 as the cover is raised. An end door 26 opens to admit the trough and is closed after the trough is in position. The lower edge of this door is spaced somewhat from the floor to afford a vent aperture 26ª, through which the air in the chamber escapes under the influence of the blast.

In the third form, Figs. 5 and 6, a cover plate 27 is provided which tightly fits over the top of the trough and is provided at one end with a pipe 28 having a flexible connection 29 to the blast pipe 12, while at the other end of the cover plate the outlet pipe 30 leads the exhaust air to a chimney or other vent, if it is not desired to permit the escape of the air into the bakery.

A still further modification is shown in Figs. 7 and 8 in which the blast pipe 12 is sleeved on a pipe length 31, fast with a frame 32 which is supported on chains 33 from overhead. A central distributing pipe 34 may be provided with downwardly opening ports 35 which direct the conditioned air down upon the dough in the trough. The entire frame may be covered with a curtain 36 which hangs down around the trough, substantially maintaining it at the temperature of the blast and protecting it from undesirable drafts.

In Fig. 9 I have shown a proofing conveyer which consists of a series of traveling belts 37 arranged to discharge from one to the other so that the divided dough lumps 38 are carried zigzag from top to bottom of the chamber 39. In the upper portion of the chamber is arranged the blast pipe 12 with its downwardly opening ports 20 which discharge the conditioned air upon the dough on the top conveyer. The air passes down over all the conveyers and out through the aperture 40 in one of the side walls. The transversely moving conveyer belt 41 may be passed through this outlet aperture so that the proofed dough is led out of the chamber at the same port at which the commingled air and gas discharges. A small port 42 may be provided in the upper portion of one of the side walls to admit the transfer delivery belt 43, by which the dough is brought into the proofing closet.

In Fig. 10 the dough has been panned, as shown at 44, and is arranged upon the several shelves of the traveling rack 45. This is merely shoved into the proofing closet 46 through the open door 47, whereupon the desired atmospheric conditions are produced by the entrance of the blast through the feed pipe 12. The door 47 is raised slightly from the floor to provide an outlet port 48 for the commingled gas and air.

It will be observed that in each apparatus means are provided for delivering to the dough, in whatever form it may be, a blast of conditioned air directed down upon the dough so as to give a constant circulation of fresh moist air over the dough, at the desired temperature which will serve not only to keep the dough at the proper temperature and humidity but also to carry off any gases which may have been formed and discharged therefrom.

I claim as my invention:—

1. A method for facilitating the fermentation of dough which consists in blowing over the surface of the dough a blast of air so conditioned as to temperature and humidity that the chemical reactions in the dough are permitted to develop to best advantage.

2. A method for facilitating the fermentation of dough which consists in subjecting it during fermentation to a current of downwardly directed air so conditioned as to temperature and humidity that the chemical reactions in the dough are permitted to develop to best advantage.

3. A method for facilitating the fermentation of dough which consists in blowing over the surface of the dough a blast of air so conditioned as to temperature and humidity that the chemical reactions in the dough are permitted to develop to best advantage, and protecting the dough during fermentation from accidental drafts.

4. The method of facilitating the fermentation of dough which consists in blowing over the exposed surfaces thereof a blast of air so conditioned as to temperature and humidity that the surface of the dough is maintained soft, the chemical reactions in the dough permitted to develop to best advantage, and the gases given off by the dough during fermentation carried away, substantially as described.

In testimony whereof I have signed my name to this specification, in the presence of two subscribing witnesses.

DAVID J. HANNA.

Witnesses:
    GEORGE WILLIAMSON,
    WALTER W. LE ROY.